United States Patent [19]

Korczykowski

[11] 4,152,951

[45] May 8, 1979

[54] CONTROL MECHANISM

[75] Inventor: Lawrence L. Korczykowski, Hamburg, N.Y.

[73] Assignee: Eaton Corporation, Cleveland, Ohio

[21] Appl. No.: 832,270

[22] Filed: Sep. 12, 1977

[51] Int. Cl.² ............... G05G 1/14; G05G 11/00; F16K 31/62

[52] U.S. Cl. .................. 74/474; 74/479; 74/512; 137/625.65; 251/295; 338/153

[58] Field of Search ............ 74/474, 478, 512, 479; 338/153; 180/77 R; 137/625.65; 251/295

[56] References Cited

U.S. PATENT DOCUMENTS

| 2,629,306 | 2/1953 | Rusconi | 137/625.65 X |
|---|---|---|---|
| 3,241,394 | 3/1966 | Rubenstein | 74/474 X |
| 3,910,133 | 10/1975 | Oestmann | 74/474 X |
| 4,014,218 | 3/1977 | Brandt | 74/474 |
| 4,040,445 | 8/1977 | McCormick | 137/625.65 X |

Primary Examiner—Allan D. Herrmann
Attorney, Agent, or Firm—D. Wood; G. Gordon Lewis; R. J. McCloskey

[57] ABSTRACT

A control mechanism for a hydraulically driven vehicle in which a control member is mounted and linked to forward and reverse actuating pedals such that when one of the directional pedals is depressed the control member body is maintained stationary and an operating shaft is rotated to generate a first directional control signal, and when the other directional pedal is depressed the operating shaft is held stationary and the control member body is rotated to generate a second, opposite directional control signal.

10 Claims, 3 Drawing Figures

CONTROL MECHANISM

BACKGROUND OF THE INVENTION

1. Field of the Invention

In one respect, this invention relates to direction controlling means.

In a further aspect, this invention relates to means for controlling hydraulic motors.

2. Description of the Prior Art

Control mechanisms for hydraulically powered drives and the like are well known in the art. Such drives are used on front end loaders and other heavy use equipment where it is desired to have infinitely variable speeds.

One example of a control mechanism for a hydraulically powered drive is disclosed in U.S. Pat. No. 3,910,133 issued to Oestmann. Oestmann discloses two foot pedals used to actuate a mechanical linkage arrangement thereby controlling the output of a hydraulic motor. The linkage is designed so that movement of one pedal does not move or otherwise affect the other pedal.

This mechanism represents an advance in the art; however, it operates with a mechanical linkage which is complex in nature and has many joints which are subject to corrosion and wear.

SUMMARY OF THE INVENTION

It is an object of this invention to provide an improved control mechanism for use in controlling the direction of a hydraulically powered vehicle.

A feature of this invention is the provision of first and second control members which are mounted on the vehicle for rotation about a common axis causing a sensing means to generate an electrical signal proportional to the degree of relative rotation between the control members, which signal in turn directs the output of a hydraulic motor arranged to perform a drive function with respect to the vehicle.

A further feature of this invention is the provision of a housing adapted to be rotated by one of the control members and an actuating shaft mounted to the other control member, the housing containing and protecting the sensing means.

As yet a further feature of this invention, the signal generated by the sensing means has a first or second sense depending on which control member is leading with respect to rotation about the common axis. The sense of the signal determines the direction of rotation of the hydraulic motor and thereby the direction in which the vehicle is moved.

DETAILED DESCRIPTION OF THE PREFERRED EMBODIMENTS

Figure 1:
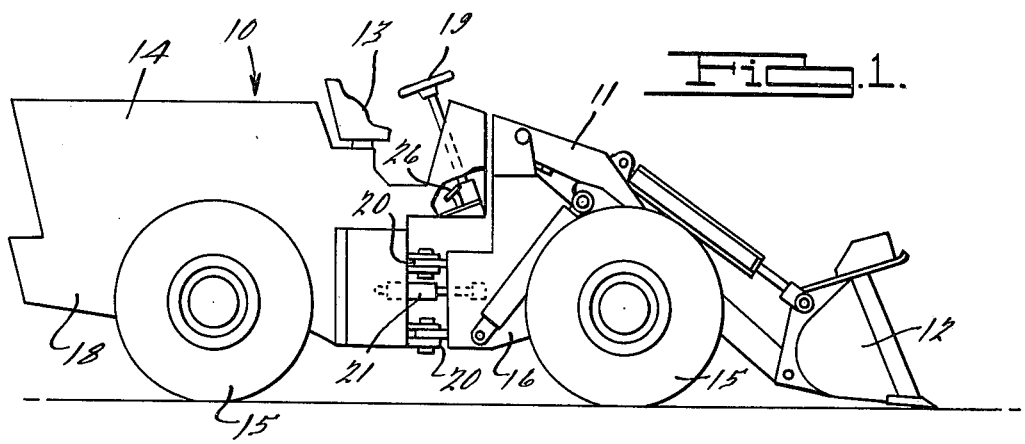
FIG. 1 shows an articulated front end loader incorporating the control mechanism of this invention.

Referring to FIG. 1, numeral 10 denotes generally an articulated vehicle suitable for loading material. A boom 11, with a loading bucket 12, is mounted at the front of the vehicle in front of the operator's station 13. The vehicle is adapted to move on wheels 15 in a forward or backward direction. The wheels 15 are driven by a hydraulic motor which is in turn powered by a hydraulic pump (not shown) connected to a prime mover located in an engine compartment 14. Such drive systems are well known in the art, and a further description is omitted in the interest of brevity.

The articulated vehicle has a front portion 16 and a back portion 18 which are connected at joints 20 allowing the front and back portions to articulate with respect to each other. The vehicle 10 is steered by means of a steering wheel 19 which activates a hydraulic steering cylinder 21. The vehicle direction, forward or backward, is controlled by means of pedals 26, 28, one pedal being shown in FIG. 1. The pedals and associated equipment are shown in greater detail in FIGS. 2 and 3.

Figure 2:
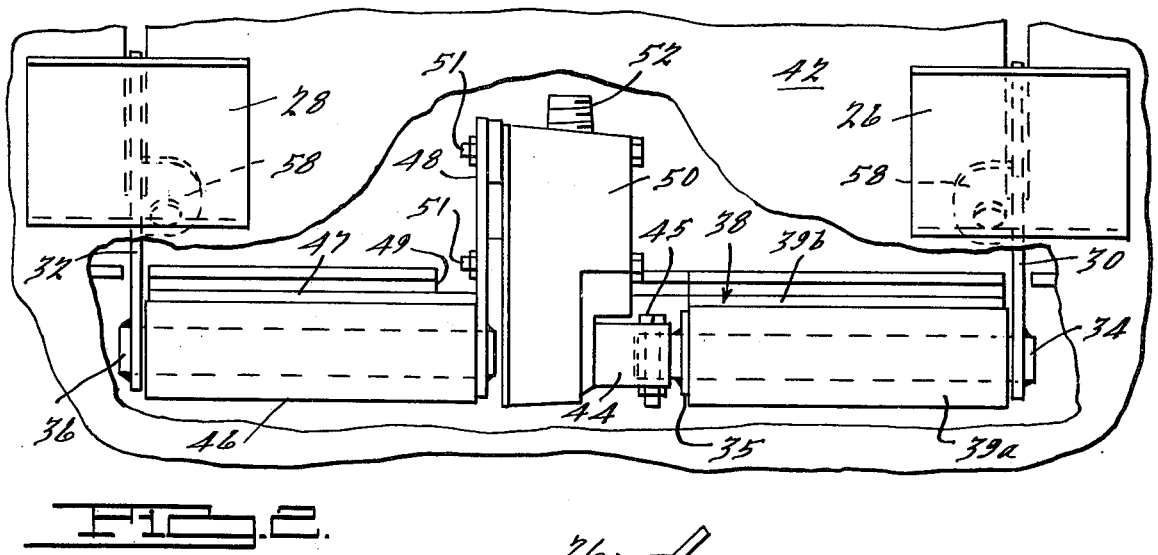
FIG. 2 shows a top view of the control mechanism of FIG. 1 with the vehicular floor board broken away for purposes of clarity.
Figure 3:
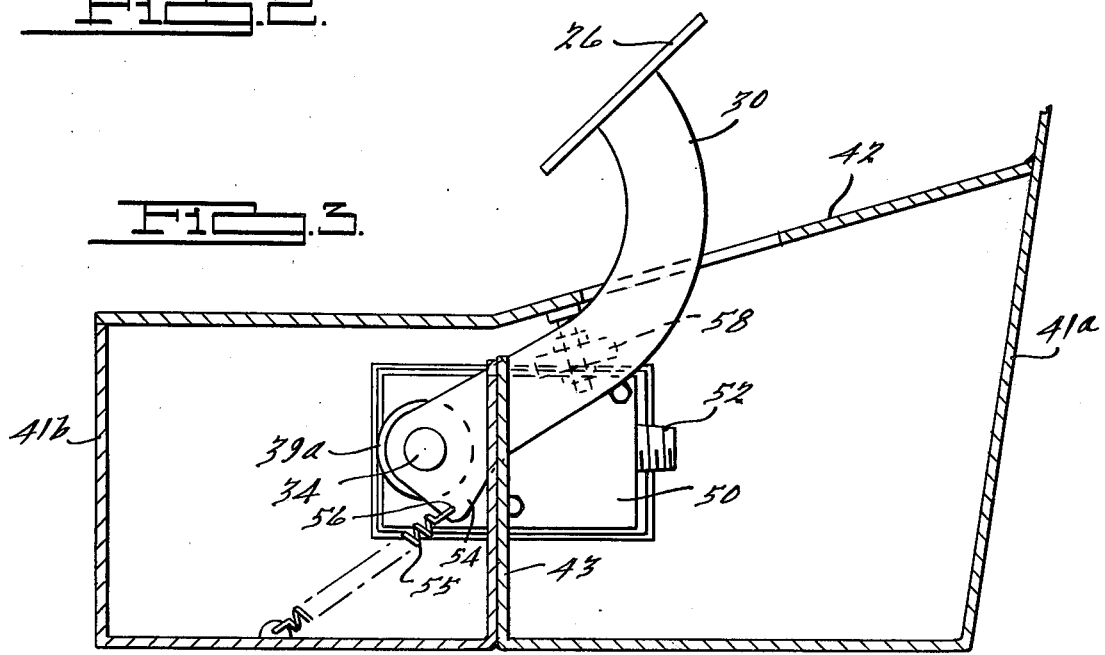
FIG. 3 is an end view as viewed from the right of FIG. 2.

As shown in FIGS. 2 and 3, a forward pedal 26 and a reverse pedal 28, designed to control the vehicle's direction, are mounted on curved standards 30 and 32 respectively. The pedals 26, 28 are raised above a floor member 42 which is in turn mounted on first and second subflooring members 41a and 41b. Subflooring member 41a extends downward from the front of the operator's station 13 and is formed so as to provide a vertical segment perpendicular to the floor 42. The second subflooring member 41b is a C-shaped piece joined at one end to the floor 42, and the other end is joined to the vertical segment of 41a, such as by welding, to form a vertical wall 43. A housing 50 containing sensing means is located within a recess 49 in the vertical wall 43. The sensing means is adapted to discern actuation of the pedals and generate a signal proportional to the actuation.

The ends of the standards distal the pedals are mounted on the outboard end of rotatable shafts 34, 36. The rotatable shaft 34, attached to forward pedal 26, is supported by a bracket 38 comprising a tubular member 39a having a longitudinal bore therethrough. The tubular member 39a is fastened to a plate 39b which is in turn mounted on vertical wall 43 under the floor 42 of the vehicle 10. The shaft 34 is journaled within the bore of tubular member 39. A washer 35 is welded or otherwise fixed to the shaft 34 near the inboard end of the shaft. If the forward pedal 26 is pushed from the full upright position shown in FIG. 2 until it touches the floor 42, the shaft 34 will rotate clockwise as viewed in FIG. 3 approximately 30 degrees.

As the shaft 34 turns within the bracket 38, an actuation means 44, fastened to the shaft 34 by a bolt 45, is rotated in a clockwise direction compared to housing 50. The actuation means is connected to sensing means which are described hereinafter.

A spring 55 acts between a boss 54, formed on standard 30 and subfloor 41b biasing the pedal 26 towards an upright position. An adjustable pedal stop 58 limits the return motion of the pedal and can be adjusted to position the pedal at the desired height.

The reverse pedal 28 is similarly configured and is mounted on a standard 32 attached to second shaft 36 mounted within a second bracket 46 welded to a plate 47 which is in turn welded to vertical wall 43. Upon actuation of the reverse pedal, the second shaft 36 will also turn in a clockwise direction when viewed as in FIG. 3. A plate 48 is attached to the inboard end of shaft 36 and, as shown, is bolted to housing 50 by means of nut and bolt combinations 51. As the shaft 36 rotates, the plate 48 and housing 50 also rotate, the housing being seated within the recess 49 formed in the vertical wall 43.

Sensing means (not shown) responsive to relative rotation between the housing and the actuation means 44 is located within the housing 50. The sensing means generates an electrical signal proportional to the degree of relative rotation between the housing 50 and the actuator 44.

The signal generated can have a first or second sense, i.e., the generated voltage could be positive or negative. The sense of the signal will depend on which control member is leading with respect to the common axis of rotation. As shown, the pedal 26 or 28 which has been depressed the furthest from neutral, the leading pedal, will determine which direction the vehicle moves and the relative amounts of depressions will determine the speed.

The signal generated controls a servo valve and thereby the output of a hydraulic motor to determine vehicle direction. Because the signal is caused by relative rotation between housing 50 and actuation means 44, rotating the housing clockwise is functionally equivalent to rotating the actuation means counterclockwise, and depressing the pedals 26, 28 equal amounts brings the system to a neutral state. Thus, the system can be controlled by depressing one pedal or releasing the other pedal. This provides added ease of operation since the operator has a choice of which pedal to push and can develop a system particularly suited to himself.

The electrical signal generated by the sensing means is relayed to a control means, not shown, such as an electrically controlled servo valve, to control the action of a hydraulic motor. Connecting means 52 to connect a current relay to the housing 50 is provided, such connecting means being well known in the art.

One example of a suitable housing-actuation means useful in the practice of this invention is the Moog control station Model 86-126 and its derivatives. These control stations provide the housing (shown as 50) which can be suitably mounted to the bracket 48 and the actuation means 44 having at least a portion which extends into said housing. In particular, this control station includes a potentiometer and dropping resistors to act on an input voltage. In the particular controls mentioned, the control station has a constant input voltage DC current. In the neutral position, there is essentially no current flowing out of the control station. As the housing or actuation means is rotated, the current shifts to become positive or negative depending on the relative rotation between the housing and actuation means. The current changes as a linear function in direct relationship to the degree of relative rotation between the housing and actuation means.

The signal generated can be used to control an electrically controlled servo valve. One example of electrically controlled servo valve is the Moog model 60 series. These servo control valves are well known in the hydraulic art. The servo valve's motion is controlled by the sense of the voltage generated, a positive voltage moving the servo valve one direction and a negative voltage moving the servo valve in the opposite direction. As the servo valve is moved, it determines the output of the hydraulic motor which in turn determines the direction the vehicle moves.

Various modifications and alterations of this invention will become obvious to those skilled in the art without departing from the scope and spirit of this invention. It is to be understood that this invention is not limited to the illustrative embodiments set forth hereinbefore. As an example, the control system could be used to control other hydraulic functions, such as boom movement or bucket movement.

What is claimed is:

1. A control mechanism for a vehicle of the type including a hydraulic motor arranged to perform a control function with respect to the vehicle, said mechanism including:
    A. first and second manual control members mounted adjacent the operator's station of the vehicle for rotation about a common axis;
    B. a housing mounted upon one of said control members for rotation therewith;
    C. actuation means disposed within said housing and mounted to said second control member for rotation therewith independent of the rotation of said housing;
    D. means within said housing operative in response to relative rotation between said housing and actuation means to generate an electrical signal generally proportional in magnitude to the degree of such relative rotation; and
    E. means operative in response to receipt of said electrical signal to control the output of said hydraulic motor in proportion to said electrical signal; whereby the vehicle performs the desired control function with respect to the vehicle.

2. A control mechanism according to claim 1 wherein:
    F. the signal generated by said electrical signal generating means also has a first or second sense depending on which control member is leading with respect to rotation about said axis; and
    G. the direction in which said hydraulic motor is driven is determined by the sense of the received electrical signal.

3. A control mechanism according to claim 1, wherein:
    said control members comprise pedals, each of said pedals being mounted on a standard, each of said standards being attached to a rotatable shaft journaled within a bracket member, said shafts rotating when said pedals are moved to activate said generating means to generate the electrical signal.

4. A control mechanism of claim 3, wherein: said shafts are mounted for rotation about a common axis.

5. In a pedal actuated control system for controlling a hydraulically powered system on a vehicle having a servo valve to control the output of a hydraulic motor in said hydraulically powered system, the improvement comprising:
    a housing mounted on said vehicle;
    an actuating shaft mounted on said vehicle connected to and adapted to rotate independently of said housing; and
    means within said housing to sense the degree of relative rotation of said housing with respect to said actuating shaft and generate an electrical signal proportional to said relative rotation which in turn activates said servo valve;
    whereby said servo valve is positioned to move the vehicle in the desired direction upon activation of said housing or said activation shaft.

6. A control system according to claim 5, wherein:
    said system includes first and second pedals mounted on one end of first and second standards respectively the opposite end of the standard being attached to an associated rotatable shaft, one of the rotatable shafts being connected to the housing and the other rotatable shaft being connected to the actuating shaft.

7. The control system of claim 6 including:
bracket means mounted on a lower surface of a floor of said vehicle opposite said pedals, said bracket means being adapted to carry said rotating shafts journaled therein.

8. In a control system for a vehicle driven by one or more hydraulic motors:
control means operable to provide directional control signals to said one or more hydraulic motors, said control means comprising a housing and an actuating shaft rotatably mounted in said housing to produce a first directional control signal when said actuating shaft and said housing are rotated in a first direction relative to each other and a second opposite directional control signal when said actuating shaft and said housing are rotated in a second direction relative to each other; a first operator actuated control shaft pivotally mounted on said vehicle and operatively connected to said actuating shaft; and
a second operator actuated control shaft pivotally mounted on said vehicle and operatively connected to said housing;
rotation of said first control shaft in a first direction relative to the vehicle being operable to produce relative rotation between said housing and said actuating shaft in said first direction relative to each other, and operation of said second control shaft in said first direction relative to the vehicle being operable to produce relative rotation between said housing and said actuating shaft in said second direction relative to each other.

9. A control system according to claim 8, wherein:
said first operator actuated control shaft has a first standard attached to the end of said first control distal said actuating shaft said first standard having attached thereto a first pedal adapted to be engaged by the operator and a second standard attached to the end of said second actuation shaft distal said housing, said second standard having a second pedal adapted to be engaged by the operator, said pedals transmitting force from the operator to the control shaft to produce a relative rotation between the housing and the actuation shaft.

10. A control system according to claim 8 including a first bracket member mounted on said vehicle said bracket being adapted to support said first control shaft, said first control shaft being journaled within said first bracket, and a second bracket member mounted on said vehicle said bracket being adapted to support said second control shaft, said second control shaft being journaled within said second bracket.

* * * * *